United States Patent Office 3,483,179
Patented Dec. 9, 1969

1

3,483,179
HETEROCYCLIC-NITROGEN ANTHRAQUINONE MONOAZO DYES

Willy Braun, Heidelberg, and Rolf Mecke, Ludwigshafen (Rhine), Germany, assignors to Badische Anilin- & Soda-Fabrik Aktiengesellschaft, Ludwigshafen (Rhine), Germany No Drawing. Filed June 1, 1967, Ser. No. 642,707
Claims priority, application Germany, June 14, 1966, 1,544,399
Int. Cl. C09b *29/36;* C07d *33/38, 51/42*
U.S. Cl. 260—154 5 Claims

ABSTRACT OF THE DISCLOSURE

Heterocyclic-nitrogen anthraquinone azo dyes useful as pigments in the production of colored paints or printing inks.

This invention relates to new anthraquinone azo dyes having the general formula

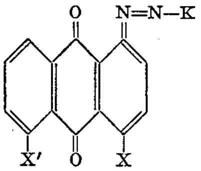

in which X denotes a hydrogen atom or a chlorine atom, X′ denotes a hydrogen atom or a chlorine atom and K denotes one of the radicals

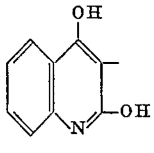

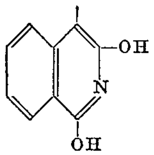

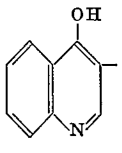

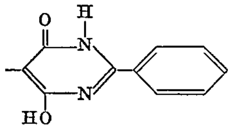

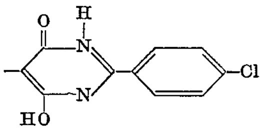

and

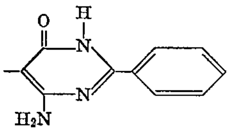

2

The new dyes (which are derived from 1-aminoanthraquinone. 1-amino-4-chloroanthraquinone or 1-amino-5-chloroanthraquinone) are distinguished as pigment dyes by very good resistance to solvents, great tinctorial strength, clear shade and high fastness to light.

The dyes may be obtained by conventional methods by condensation or azo coupling, preferably by coupling diazo compounds of amines having the general formula

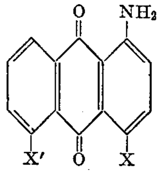

with coupling components having the general formula HK, the symbols X, X′ and K having the meanings given above. The new dyes may be used, if necessary after finishing by conventional methods, for all purposes of pigment technology, particularly for the production of colored paints or printing inks.

The invention is illustrated by the following examples in which parts and percentages are by weight.

EXAMPLE 1

22.5 parts of 1-aminoanthraquinone is dissolved in 250 parts of 96% sulfuric acid. The solution is then poured onto a mixture of 1000 parts of ice-water and 7 parts of sodium nitrite, stirred for one hour while cooling with ice, excess of nitrite is destroyed in the usual way and the diazonium salt is suction filtered.

The diazonium salt is suspended in 1000 parts of water and the solution is added in portions to a solution of 17 parts of 2,4-dihydroxyquinoline, 1000 parts of water and 8 parts of sodium hydroxide, a pH value of 8 being maintained during coupling by adding dilute caustic soda solution. The whole is stirred for another five hours, suction filtered and washed with water. 35 parts of a yellow dye having the formula

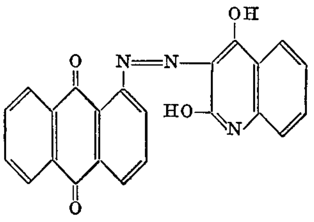

is obtained which is practically insoluble in organic solvents. Similar dyes are obtained in an analogous way using the starting materials specified in the following table:

| Example | Diazo component | Coupling component | Color |
|---|---|---|---|
| 2 | 1-aminoanthraquinone | 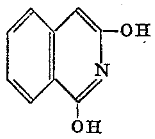 | Yellow. |
| 3 | do | 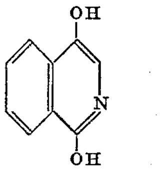 | Red. |
| 4 | do | 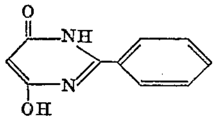 | Yellow. |
| 5 | do | 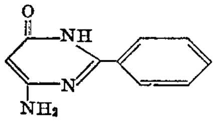 | Do. |
| 6 | 1-amino-4-chloroanthraquinone | 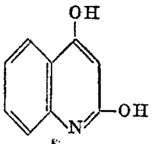 | Do. |
| 7 | do | 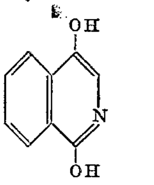 | Red. |
| 8 | do | 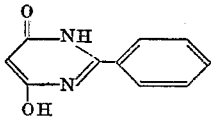 | Yellow. |
| 9 | do | 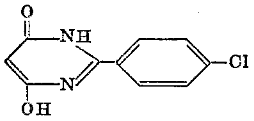 | Do. |
| 10 | do | 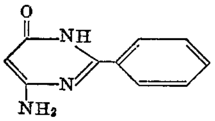 | Do. |
| 11 | 1-amino-5-chloroanthraquinone | 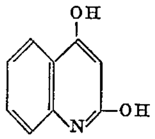 | Do. |
| 12 | do | 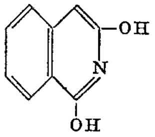 | Do. |
| 13 | do | 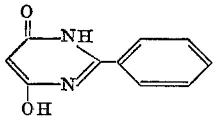 | Do. |

We claim:

1. Dyes having the general formula

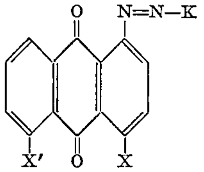

in which X denotes a hydrogen atom or a chlorine atom, X' denotes a hydrogen atom or a chlorine atom and K denotes one of the radicals

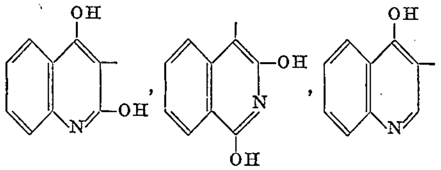

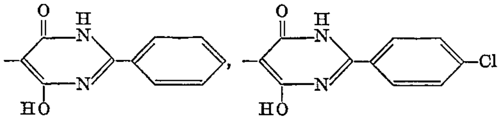

and

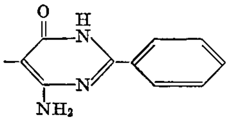

2. The dye having the formula

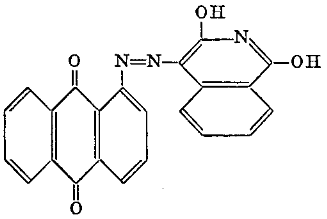

3. The dye having the formula

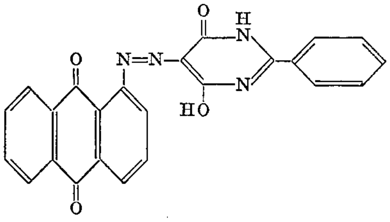

4. The dye having the formula

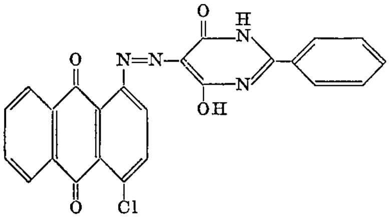

5. The dye having the formula

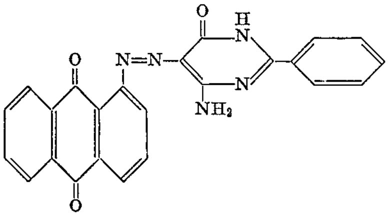

References Cited

UNITED STATES PATENTS 3,320,233 5/1967 Braun et al. -------- 260—155

CHARLES B. PARKER, Primary Examiner

DONALD M. PARUGA, Assistant Examiner

U.S. Cl. X.R.

106—22, 288; 260—155, 256.4, 289